(12) United States Patent
Okada et al.

(10) Patent No.: US 7,810,363 B2
(45) Date of Patent: Oct. 12, 2010

(54) ELECTRIC STEERING LOCKING APPARATUS

(75) Inventors: Takahiro Okada, Kanagawa-ken (JP); Tetsuyuki Tsukano, Kanagawa-ken (JP)

(73) Assignee: Alpha Corporation, Yokohama-shi (JP)

( * ) Notice: Subject to any disclaimer, the term of this patent is extended or adjusted under 35 U.S.C. 154(b) by 727 days.

(21) Appl. No.: 11/579,634

(22) PCT Filed: Sep. 20, 2005

(86) PCT No.: PCT/JP2005/017254

§ 371 (c)(1),
(2), (4) Date: Nov. 6, 2006

(87) PCT Pub. No.: WO2006/046365

PCT Pub. Date: May 4, 2006

(65) Prior Publication Data
US 2008/0271504 A1 Nov. 6, 2008

(30) Foreign Application Priority Data
Oct. 29, 2004 (JP) .............................. 2004-315834

(51) Int. Cl.
*B60R 25/02* (2006.01)
(52) U.S. Cl. .......................................... 70/186; 70/252
(58) Field of Classification Search ........... 70/182–186, 70/252
See application file for complete search history.

(56) References Cited

U.S. PATENT DOCUMENTS

| | | | | |
|---|---|---|---|---|
| 5,495,732 A * | 3/1996 | Nagae et al. | .................. | 70/252 |
| 6,076,382 A * | 6/2000 | Naganuma | ................... | 70/186 |
| 6,233,986 B1 * | 5/2001 | Suzuki et al. | ................. | 70/186 |
| 6,327,882 B1 * | 12/2001 | Canard | ........................ | 70/186 |
| 6,354,117 B1 * | 3/2002 | Canard | ........................ | 70/186 |
| 6,755,058 B2 * | 6/2004 | Zillmann | ..................... | 70/252 |
| 6,810,700 B2 * | 11/2004 | Okuno | ........................ | 70/186 |
| 6,826,934 B2 * | 12/2004 | Canard | ........................ | 70/186 |
| 6,862,907 B2 * | 3/2005 | Hayashi et al. | ............... | 70/186 |
| 6,915,671 B2 * | 7/2005 | Zillmann | ..................... | 70/186 |
| 7,009,479 B1 * | 3/2006 | Chung et al. | ................. | 335/234 |
| 7,140,213 B2 * | 11/2006 | Feucht et al. | ................. | 70/186 |
| 7,267,018 B2 * | 9/2007 | Kai | ........................... | 73/865.8 |
| 7,328,596 B2 * | 2/2008 | Hasegawa et al. | ............. | 70/186 |
| 2001/0029758 A1 * | 10/2001 | Kehr | .......................... | 70/252 |
| 2002/0088257 A1 | 7/2002 | Dimig et al. | | |
| 2002/0108412 A1 | 8/2002 | Starken | | |

(Continued)

FOREIGN PATENT DOCUMENTS

JP 5-63992 8/1993

(Continued)

*Primary Examiner*—Suzanne D Barrett
(74) *Attorney, Agent, or Firm*—The Nath Law Group; Jerald L. Meyer; Derek Richmond (57) ABSTRACT

An electric steering locking apparatus includes a cam plate (5) that rotates in an unlocking direction (R1) and a locking direction (R2) by driving operation of a motor unit, and a locking shaft (8) that follows a sliding surface (6) of the cam plate (5) and that moves between a locking position where the rotation of a steering shaft is prevented and an unlocking position where the rotation of the steering shaft is permitted. The cam plate (5) is set such that a rotation center (O) coincides with a center of gravity (G).

2 Claims, 8 Drawing Sheets

U.S. PATENT DOCUMENTS

2004/0027239 A1 * 2/2004 Hayashi et al. ............ 340/5.61

FOREIGN PATENT DOCUMENTS

| JP | 11-94691 | 4/1999 |
| JP | 11-342500 | 12/1999 |
| JP | 2002-205622 A | 7/2002 |
| JP | 2003-276565 A | 10/2003 |
| JP | 2003-341479 A | 12/2003 |

* cited by examiner

ELECTRIC STEERING LOCKING APPARATUS

TECHNICAL FIELD

The present invention relates to an electric steering locking apparatus that locks a steering shaft of an automobile.

BACKGROUND ART

Japanese Patent Application Laid-Open No. 2002-205622 discloses a conventional electric steering locking apparatus of this kind. When the electric steering locking apparatus constitutes a cam member, the electric steering locking apparatus mainly includes a rotation shaft that is rotated by driving operation of a drive source, the cam member that is fixed to the rotation shaft and that rotates together with the rotation shaft in an unlocking direction and a locking direction, a locking member that has a cam abutment surface abutting against a sliding surface of the cam member and that follows the sliding surface of the cam member and moves between a locking position where the rotation of a steering shaft is locked and an unlocking position where the rotation of the steering shaft is permitted, and a spring that biases the locking member toward the locking position.

With the above configuration, while a vehicle is parked, the locking member is located in the locking position and the steering shaft is locked. Thus, the vehicle can be theftproof during parking.

When a parked vehicle is to be driven, the cam member rotates in the unlocking direction by the driving operation of the drive source, the locking member is brought into the unlocking position, and the rotation of the steering shaft is permitted.

DISCLOSURE OF THE INVENTION

In the electric steering locking apparatus, it is necessary to always maintain the locking member in the unlocking position except during parking, and to maintain the locking member in the locking position during parking. If a relation between a rotation position and a center of gravity of the cam member is not taken into consideration, following problem occurs.

That is, if the center of gravity of the cam member is deflected with respect to the rotation center of the cam member, self-inertia moment is generated by impact, vibration, or the like which is applied to the cam member. In a position of the cam member where the locking member is brought into the unlocking position, if the direction of the self-inertia moment matches with the locking direction of the cam member, there is a possibility that the cam member rotates in the locking direction and the locking member moves to the locking position. In a position of the cam member where the locking member is brought into the locking position, if the direction of the self-inertia moment matches with the unlocking direction of the cam member, there is a possibility that the cam member rotates in the unlocking direction and the locking member moves to the unlocking position.

It is an object of the present invention to provide an electric steering locking apparatus that can prevent the cam member from moving by the self-inertia moment.

To achieve the above object, according to an aspect of the present invention, there is provided an electric steering locking apparatus including a cam member that rotates in an unlocking direction and a locking direction by driving operation of a drive source, and a locking member that follows a sliding surface of the cam member and that moves between a locking position where the rotation of a steering shaft is prevented and an unlocking position where the rotation of the steering shaft is permitted, wherein the cam member is set such that a rotation center coincides with a center of gravity.

With this configuration, even when impact, vibration, or the like is applied to the cam member, no self-inertia moment is generated in the cam member. Thus, displacement caused by the self-inertia moment can be prevented.

The electric steering locking apparatus may further include a steering lock preventing unit that prevents the locking member located in the unlocking position from moving.

With this configuration, since the locking member is prevented from moving toward the locking position also by the steering lock preventing unit, the unlocking position of the locking member can be maintained more reliably.

BRIEF DESCRIPTION OF THE DRAWINGS

FIG. 8(*a*) is a perspective view of the cam plate as viewed from a cam main body side and FIG. 8(*b*) is a perspective view of the cam plate as viewed from a barycenter adjusting unit side, respectively according to the embodiment of the invention.

BEST MODE FOR CARRYING OUT THE INVENTION

An embodiment of the present invention will be explained below with reference to the drawings.

Figure 1:
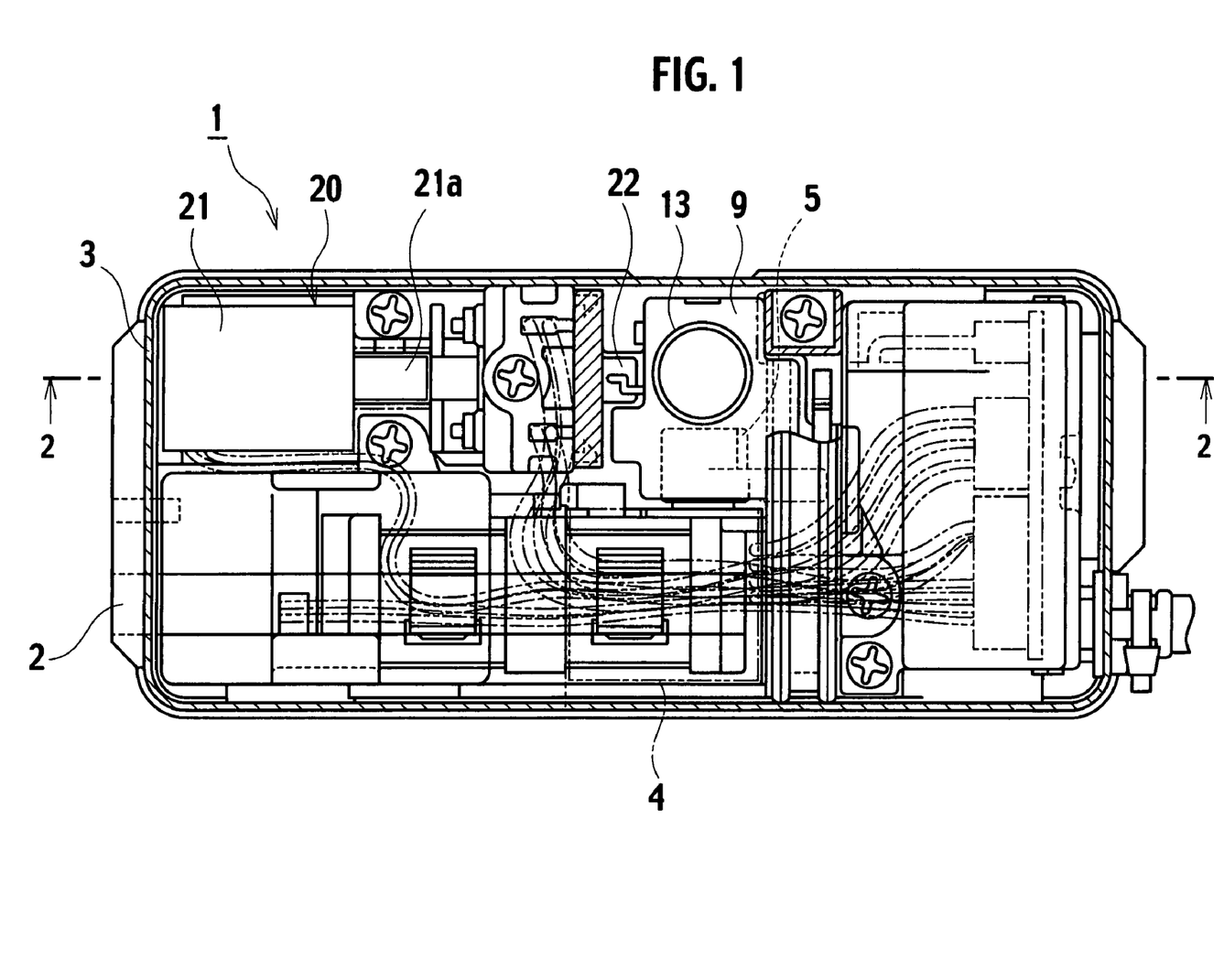
FIG. 1 is a plan view of an electric steering locking apparatus according to an embodiment of the present invention.
Figure 2:
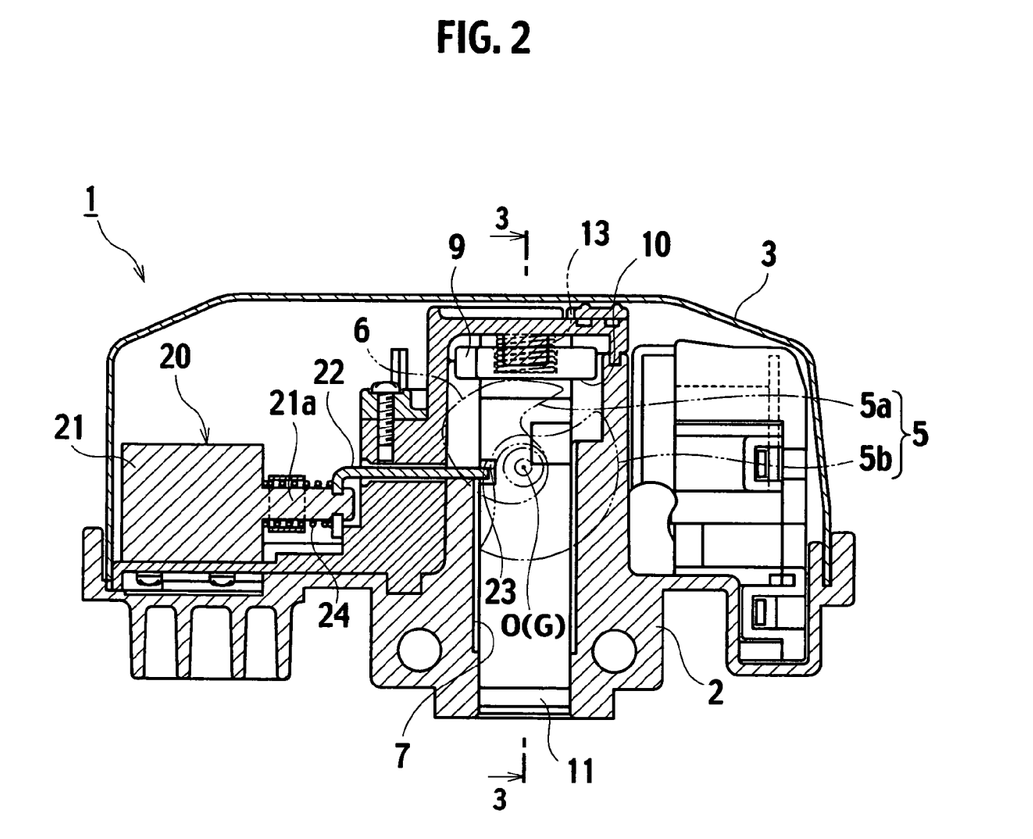
FIG. 2 is a cross section taken along line 2-2 in FIG. 1 when a locking shaft is in an unlocking position according to the embodiment of the invention.
Figure 5:
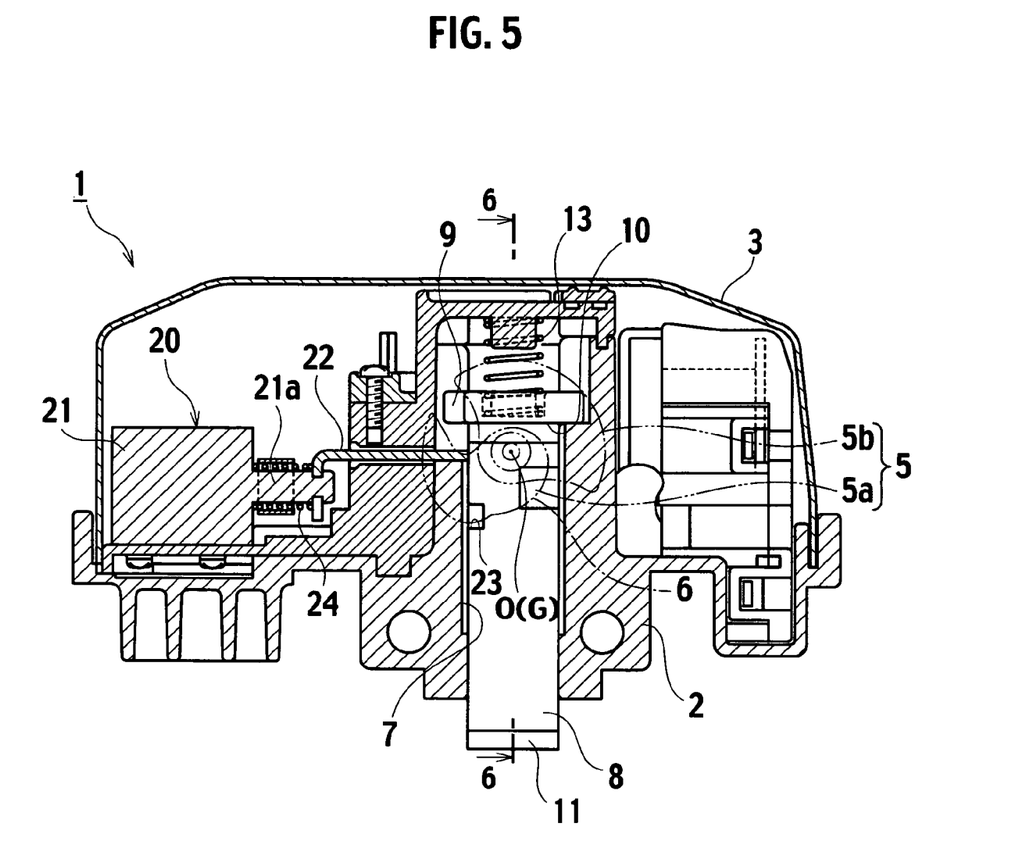
FIG. 5 is a cross section taken along line 2-2 in FIG. 1 when the locking shaft is in a locking position according to the embodiment of the invention.

As shown in FIGS. 1, 2, and 5, an electric steering locking apparatus 1 includes a frame 2 and a cover 3 that covers an upper portion of the frame 2. A motor unit 4 which is a drive source is fixed on the frame 2 covered with the cover 3. The motor unit 4 includes a speed reduction mechanism therein, and a cam plate 5 which is a cam member is fixed to a rotation shaft (not shown) projecting from a unit case.

Figure 8:
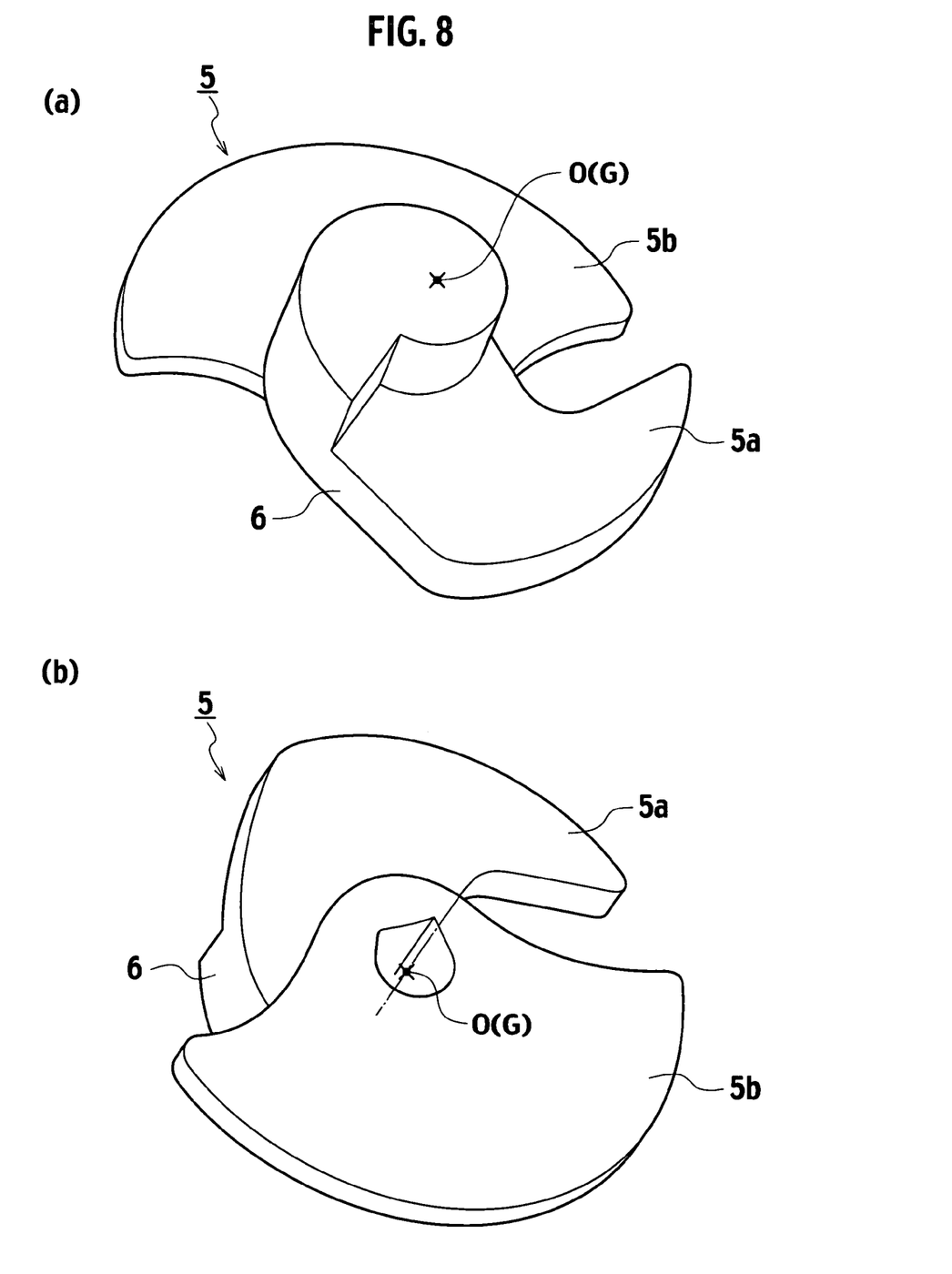

The cam plate 5 is rotated in an unlocking direction R1 and its opposite locking direction R2 by rotation of the rotation shaft. As shown in FIGS. 8(*a*) and (*b*) in detail, the cam plate 5 includes a cam main body 5*a* and a substantially sector barycenter adjusting unit 5*b* which is integrally formed on the cam main body 5*a* using the same material. An outer peripheral surface of the cam main body 5*a* is formed as a sliding surface 6. The sliding surface 6 is set such that a distance from a rotation center O to the sliding surface 6 is gradually varied with variation of the rotation angle. The cam plate 5 is set such that the rotation center O coincides with a center of gravity G by the barycenter adjusting unit 5*b*.

With reference to FIGS. 2 and 5, the frame 2 is formed with a sliding hole 7 penetrating the frame 2 in a vertical direction. A locking shaft 8 which is a locking member is movably disposed in the sliding hole 7. A hanger portion 9 is fixed to an upper end of the locking shaft 8. A lower surface of the hanger portion 9 is formed as a cam abutment surface 10. The cam abutment surface 10 abuts against the sliding surface 6 of the cam plate 5. Spring force of a spring 13 is applied to an upper surface of the hanger portion 9. The locking shaft 8 is biased toward the locking position by the spring force and the cam abutment surface 10 is pushed by the cam plate 5.

Figure 3:
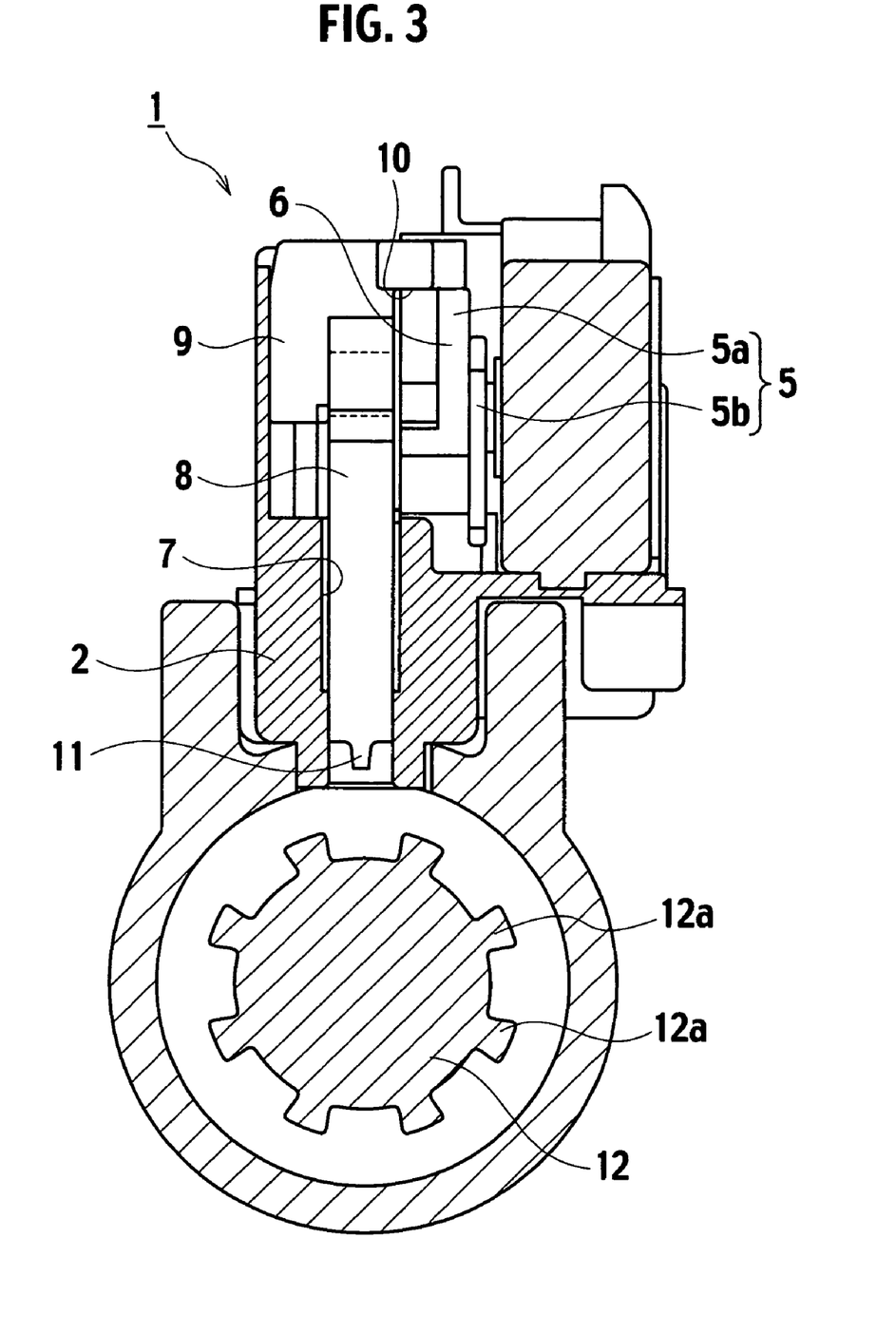
FIG. 3 is a cross section taken along line 3-3 in FIG. 2 according to the embodiment of the invention.
Figure 4:
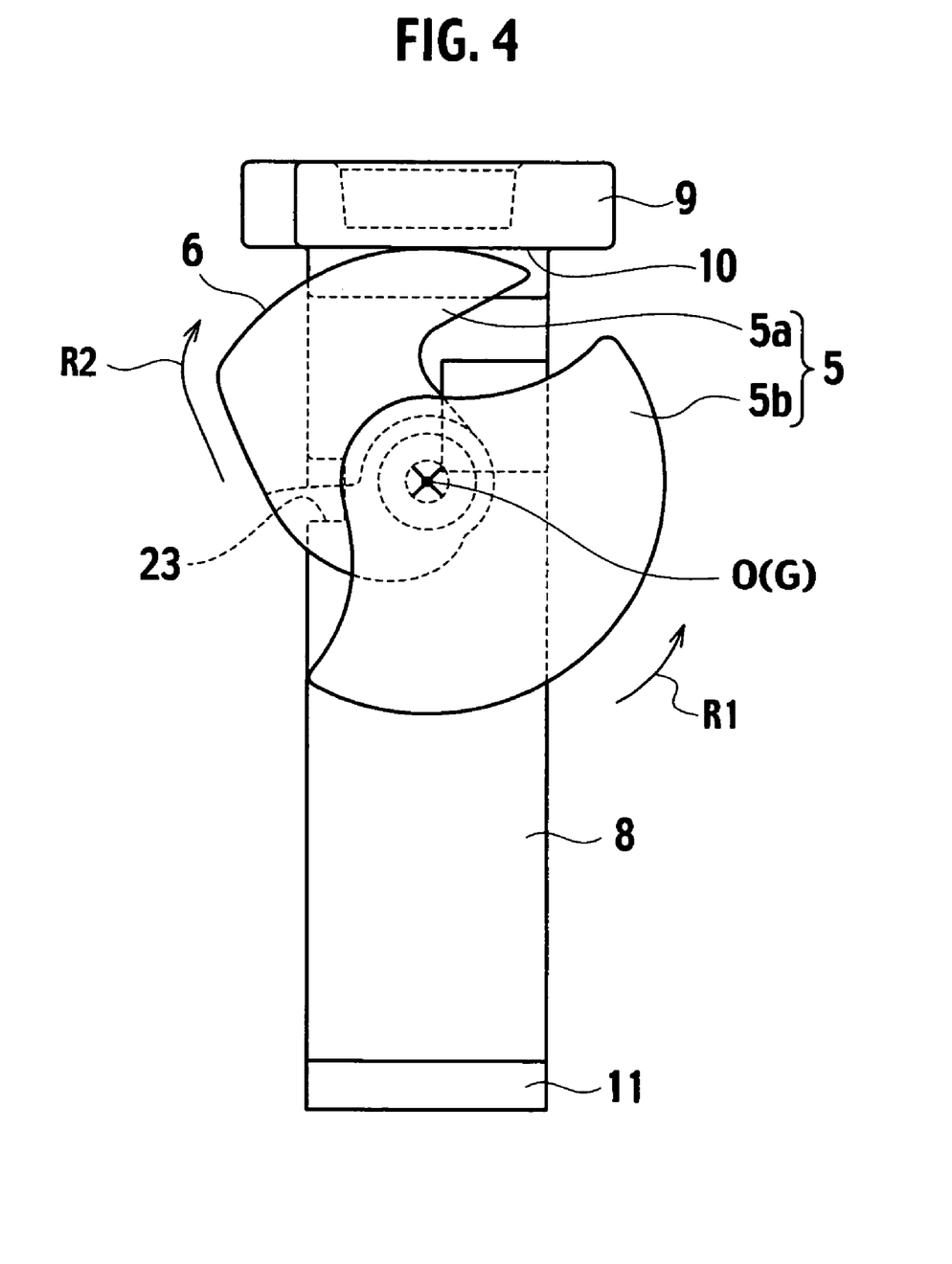
FIG. 4 is a schematic enlarged view showing a layout of the locking shaft and a cam plate in an unlocking position according to the embodiment of the invention.

The locking shaft 8 is provided at its lower end with an engaging pin portion 11. The locking shaft 8 moves by following the sliding surface 6 of the cam plate 5, and moves between a locking position shown in FIGS. 5 to 7 and an unlocking position shown in FIGS. 2 to 4. In the locking position, the engaging pin portion 11 enters between projections 12a of a steering shaft 12 (state shown in FIG. 6), thereby preventing rotation of the steering shaft 12. In the unlocking position, the engaging pin portion 11 is located out of rotation locus of the projections 12a of the steering shaft 12 (state shown in FIG. 3), thereby permitting the rotation of the steering shaft 12.

As shown in FIGS. 1, 2, and 5, the electric steering locking apparatus 1 includes a steering lock preventing unit 20. The steering lock preventing unit 20 includes an electromagnetic solenoid 21 fixed on the frame 2 covered with the cover 3. One end of a lock plate 22 is fixed to an extendable rod 21a of the electromagnetic solenoid 21. A tip end of the lock plate 22 extends to a position close to the locking shaft 8. When the locking shaft 8 is located in the unlocking position and the electromagnetic solenoid 21 is turned OFF, the lock plate 22 enters a retaining groove 23 of the locking shaft 8 by a spring 24, thereby preventing the locking shaft 8 from moving. If the electromagnetic solenoid 21 is turned ON, the lock plate 22 retreats from the retaining groove 23 of the locking shaft 8, and the locking shaft 8 is permitted to move.

Figure 6:
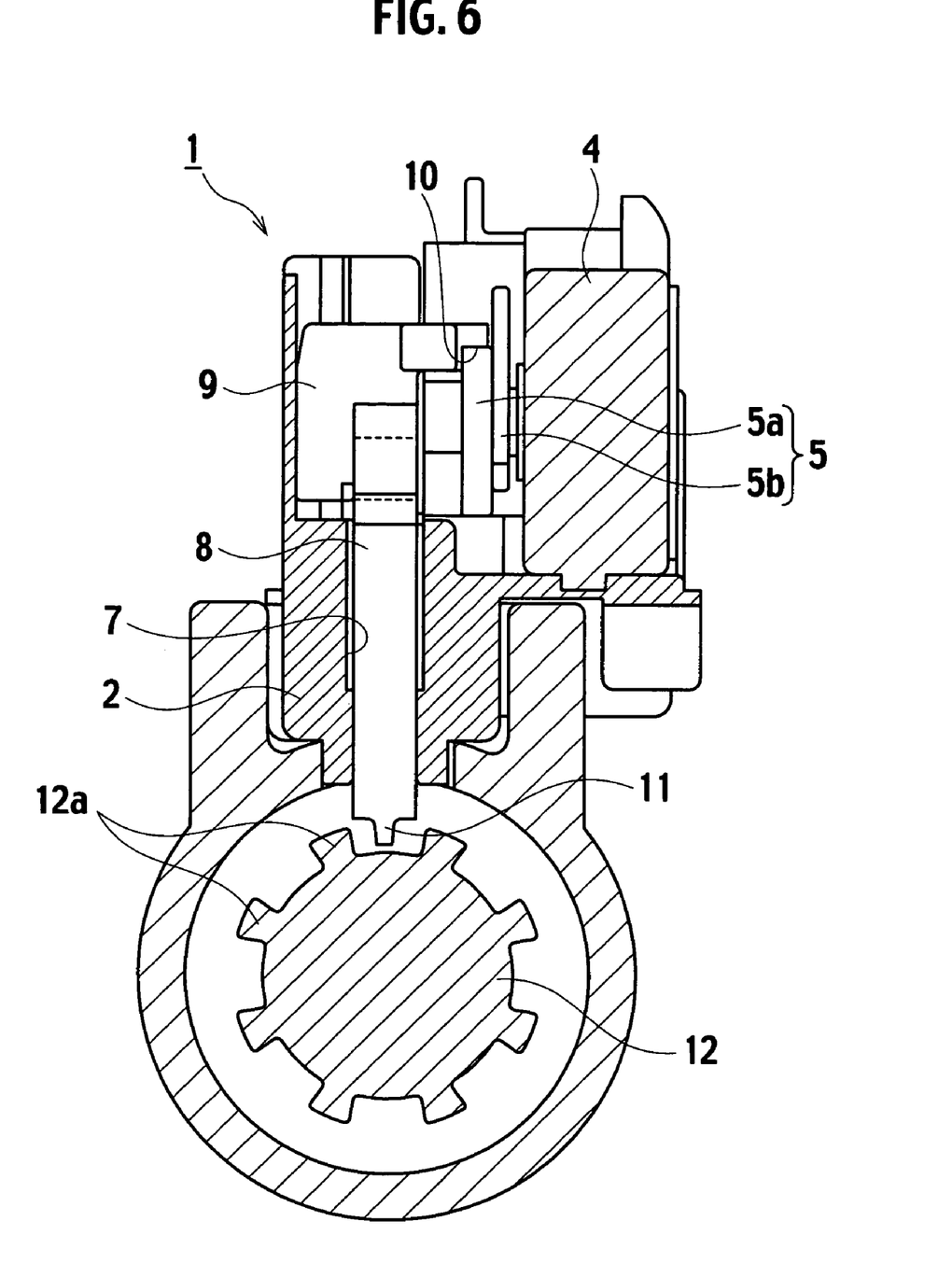
FIG. 6 is a cross section taken along line 6-6 in FIG. 5 according to the embodiment of the invention.
Figure 7:
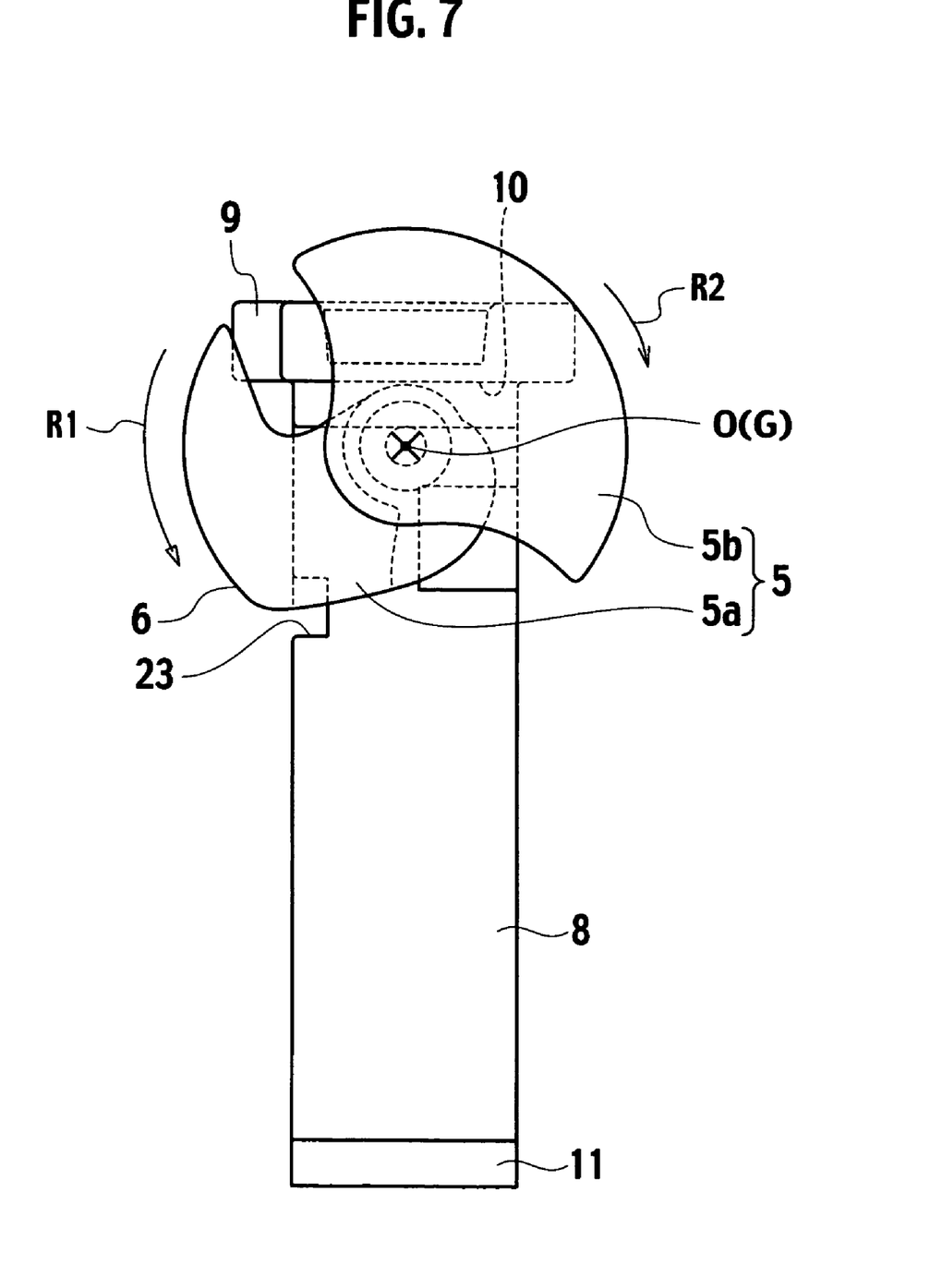
FIG. 7 is schematic enlarged view showing a layout of the locking shaft and the cam plate in the locking position according to the embodiment of the invention.

With this configuration, while the vehicle is parked, the locking shaft 8 is located in the locking position shown in FIGS. 5 to 7, and the rotation of the steering shaft 12 is locked. Thus, the vehicle can be theftproof.

If a driver depresses a steering lock switch (not shown) to start an engine, the motor unit 4 is driven to rotate the cam plate 5 in the unlocking direction R1. With this, the locking shaft 8 moves to the unlocking position shown in FIGS. 2 to 4, and the rotation of the steering shaft 12 is permitted.

If the locking shaft 8 moves to the unlocking position, the electromagnetic solenoid 21 of the steering lock preventing unit 20 is retained to the retaining groove 23 of the locking shaft 8 by the biasing force of the spring 24. While the engine is started and the vehicle runs, the locking shaft 8 keeps the unlocking position and the steering shaft 12 is permitted to freely rotate.

If the engine is stopped and the locking shaft 8 moves to the locking position, the electromagnetic solenoid 21 of the steering lock preventing unit 20 is turned ON, the lock plate 22 is disengaged from the retaining groove 23 of the locking shaft 8, the motor unit 4 is driven, and the cam plate 5 is rotated in the locking direction R2. With this, the locking shaft 8 moves to the locking position shown in FIGS. 5 to 7, and the steering shaft 12 is prevented from rotating.

In the electric steering locking apparatus 1 operated as described above, even when an external force such as impact and vibration is applied to the cam plate 5, since the rotation center O coincides with the center of gravity G, self-inertia moment which may occur due to the impact, vibration, or the like is not generated in the cam plate 5. Therefore, in the position (FIGS. 2 to 4) of the cam plate 5 where the locking shaft 8 is in the unlocking position, the cam plate 5 will not be rotated in the locking direction by the self-inertia moment to move the locking shaft 8 to the locking position. In the position (FIGS. 5 to 7) of the cam plate 5 where the locking shaft 8 is in the locking position, the cam plate 5 will not be rotated in the unlocking direction by the self-inertia moment to move the locking shaft 8 to the unlocking position.

In the embodiment, when the locking shaft 8 is in the unlocking position, the locking shaft 8 is prevented from moving toward the locking position also by the steering lock preventing unit 20.

In the embodiment, a possibility that the steering shaft 12 is locked during running of the vehicle is prevented by the above-described configuration of the cam plate 5 and by the steering lock preventing unit 20. Particularly, when the steering lock preventing unit 20 does not normally operate for some reason, the cam plate 5 prevents the locking shaft 8 from locking the steering shaft 12. The steering lock preventing unit 20 prevents the locking shaft 8 biased by the spring 13 from locking the steering shaft 12, for example, when the motor unit 4 is erroneously operated and the cam plate 5 tries to rotate unintentionally or when the locking shaft 8 is unintentionally disengaged from the cam plate 5 by abrupt vibration or the like during running.

In this embodiment, the cam plate 5 is set so that the rotation center O coincides with the center of gravity G by integrally providing the cam main body 5a with the barycenter adjusting unit 5b which is made of the same material. Alternatively, it is also possible to form a hollow portion or the like in the cam plate 5 itself by making the barycenter adjusting unit 5b of a different material, and to match the rotation center O and the center of gravity G with each other without providing the barycenter adjusting unit 5b.

Although the steering lock preventing unit 20 is provided in this embodiment, it is possible to prevent locking of the steering shaft 12 during running of the vehicle without providing the steering lock preventing unit 20. If the steering lock preventing unit 20 is not provided, the electric steering locking apparatus 1 can be reduced in size, weight, and cost.

The invention claimed is:

1. An electric steering locking apparatus comprising:
    a cam member that rotates in an unlocking direction and a locking direction by driving operation of a drive source, the cam having a rotation center and a center of gravity; and
    a locking member that moves between a locking position where a steering shaft is prevented from rotating and an unlocking position where the steering shaft is permitted to rotate by rotation of the cam member,
    wherein the cam member is set such that the cam rotation center coincides with the cam center of gravity.

2. The electric steering locking apparatus according to claim 1, further comprising a steering lock preventing unit that prevents the locking member located in the unlocking position from moving.

* * * * *